(12) United States Patent
Magnusson (10) Patent No.: US 8,039,750 B2
(45) Date of Patent: Oct. 18, 2011

(54) CABLE CONNECTOR HAVING LENGTH ADJUSTABILITY

(75) Inventor: Stefan Magnusson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 449 days.

(21) Appl. No.: 12/269,351

(22) Filed: Nov. 12, 2008

(65) Prior Publication Data

US 2010/0116547 A1    May 13, 2010

(51) Int. Cl.
 *H02G 3/04* (2006.01)
(52) U.S. Cl. .................................. 174/135; 439/501
(58) Field of Classification Search .............. 439/501; 174/135–136, 70 R
See application file for complete search history.

(56) References Cited

U.S. PATENT DOCUMENTS

| | | | |
|---|---|---|---|
| 2,984,714 A | 5/1961 | Kunkle | |
| 3,068,316 A | 12/1962 | Witt | |
| 3,337,682 A | 8/1967 | Swett | |
| 5,118,907 A * | 6/1992 | Stout et al. | 174/135 |
| 6,471,542 B1 * | 10/2002 | Comer | 439/501 |
| 7,202,414 B2 * | 4/2007 | Johnson | 174/36 |
| 7,446,260 B2 * | 11/2008 | Hammonds | 174/154 |
| 7,654,860 B2 * | 2/2010 | Shih et al. | 439/501 |
| 2003/0207611 A1 | 11/2003 | Lin et al. | |
| 2006/0178041 A1 | 8/2006 | Lund et al. | |
| 2009/0250245 A1 * | 10/2009 | Kwak | 174/135 |
| 2009/0303667 A1 * | 12/2009 | Scifo et al. | 361/679.01 |

OTHER PUBLICATIONS

International Search Report, corresponding with PCT/EP2009/055654, mailed on Aug. 12, 2009.
Written Opinion, corresponding to PCT/EP2009/055654 mailed on Aug. 12, 2009.

* cited by examiner

*Primary Examiner* — Michael Zarroli
(74) *Attorney, Agent, or Firm* — Renner, Otto, Boisselle & Sklar, LLP (57) ABSTRACT

A combined cable connector and cable untangler is disclosed. The combined cable connector and untangler comprises a single elongated body with at least one through hole extending along the whole body length. The cable connector is adapted to be used with a portable electronic device. The cable connector enables the cable to be adapted in length and prevents it from being entangled.

17 Claims, 6 Drawing Sheets

CABLE CONNECTOR HAVING LENGTH ADJUSTABILITY

TECHNICAL FIELD OF THE INVENTION

The present invention relates to a cable connector. The cable connector may advantageously be used as an accessory item for the usage together with a portable electronic device.

DESCRIPTION OF RELATED ART

Today, there exist various accessory items for the usage together with portable electronic devices. For instance, there exist cables and cable connectors for connecting portable accessory items, such as headsets, earphones, portable loudspeakers or the like, to portable electronic devices, such as mobile telephones, laptop, smart phones, communicators, cameras, digital audio players (e.g. MP3-players or iPods®), etc, and for connecting these portable electronic devices to other devices, such as stationary loudspeakers or computers, both stationary and laptops, or other electronic devices, e.g. picture or movie projectors, such as television receivers, monitors or electronic picture frames.

There also exist cable protecting devices for preventing cables and cable connectors from entanglement and for making the cables more stylish and more practical when handling, e.g. cable sleeves for cables in computers or cables, e.g. power cables to different electronic appliances, such as television receivers, home cinemas and audio systems, or the like, in homes, etc. Some examples of cables on the market are USB-, Firewire-, power cables and cables for charging electronic devices.

Consequently, there are currently many different cables and cable connectors for the usage together with electronic devices, especially portable ones. This may give rise to problems for a user having at least one portable electronic device and at least one cable connected to the device or adapted to be connected thereto to keep track of and handle. This may be annoying to the user if the user wishes to bring around the portable electronic device with the cable, especially when putting the portable electronic device and/or the cable in and taking the device and/or the cable out of pockets, purses or other similar places for storage as the cable get entangled in itself and/or in other cables, if more than one cable is used, and/or in other adjacent items, especially elongated items, e.g. key chains or straps or similar items.

Furthermore, this may involve an increased cost for the user as the user may destroy the cables by using too much force when trying to untangle the cables, whereby new cables and cable connectors may have to be bought. In a worst case scenario, the cable that is pulled too violently may be connected to an electronic device, whereby the electronic device, especially the socket into which the cable is plugged into, may break or at least be damaged creating loose or bad contact or even no contact between the socket and the cable plug, whereby the electronic device must be repaired or even replaced incurring at least practical problems, and, in a worst case scenario, if a new electronic device has to be bought, increased costs.

SUMMARY OF THE INVENTION

It has therefore, with the above and following description in mind, then, an aspect of the present invention is to provide an improved device, which seeks to mitigate, alleviate or eliminate one or more of the above-identified deficiencies in the art and disadvantages singly or in any combination.

The present invention is defined by the appended independent claims. Various advantageous embodiments of the invention are set forth by the appended dependent claims as well as by the following description and the accompanying drawings.

Another aspect relates to a cable connector for connection to at least one electronic device, the cable connector comprising at least one cable and at least one cable sleeve, and at least two sliding means, the cable being arranged to run through the sleeve and the sliding means, and the sleeve being adapted to restrict the movement of the cable in at least one direction.

Another aspect relates to the cable connector being adapted to be adjustable in length for enabling cable length adjustability.

Another aspect relates to the cable connector, wherein the sliding means are attached to the cable sleeve having openings at each end.

Another aspect relates to the cable connector, wherein at least one sliding means is attached to an end of the cable sleeve.

Another aspect relates to the cable connector, wherein each sliding means is attached to an end of the cable sleeve.

Another aspect relates to the cable connector, wherein each sliding means has the function of a tackle.

Another aspect relates to the cable connector, wherein each sliding means is a ring.

Another aspect relates to the cable connector, wherein the cable has two connectors, one connector at each end, and at least one connector comprises at least one sliding means.

Another aspect relates to the cable connector, wherein each sliding means is larger than the cable sleeve openings.

Another aspect relates to the cable connector, wherein the cable connector is intended for the usage together with a portable electronic device.

Another aspect relates to the cable connector, wherein the cable connector is adapted for connecting a headset to the portable electronic device.

Another aspect relates to the cable connector, wherein the headset comprises an additional cable sleeve for restricting the movement of at least one cable of the headset in at least one direction.

Another aspect relates to the cable connector, wherein the headset cable sleeve is adapted to be fixedly attached with one end at a connector end of the headset and to extend with the other sleeve end towards the earphones of the headset.

Another aspect relates to the cable connector, wherein the cable connector is intended for the usage together with the portable electronic device, wherein the portable electronic device is a device from a group comprising: a mobile radio terminal, a mobile telephone, a cellular telephone, a pager, a communicator, a smart phone, a Personal Digital Assistant (PDA), an electronic organizer, a computer, an audio player or a digital camera.

Another aspect relates to the cable connector, wherein the cable sleeve has an inherent/integrated elasticity/resilience.

Another aspect relates to the cable connector, wherein the cable sleeve is made of a flexible material.

Another aspect relates to the cable connector, wherein the cable sleeve is made of leather, fabric or a Neoprene® material.

Another aspect relates to the cable connector, wherein the cable sleeve comprises at least two separate channels/lead-throughs/through-connections, whereby each channel forms one cable run for the cable (such that no more one cable runs through each channel/single-circuit line).

Another aspect relates to the cable connector, wherein at least one connector has at least one integrated sliding means.

Another aspect relates to the cable connector, wherein at least one connector has an integrated attachment for at least one sliding means.

Another aspect relates to a cable sleeve adapted to be connected to at least one cable, wherein the cable sleeve and the cable after connection form a cable connector according to any of the preceding claims.

Some embodiments of the present invention provide an accessory item in the form of a cable connector that serves a dual purpose. The cable connector prevents cables from getting entangled with themselves or other cables or items, e.g. keys, key chains, or the like, while, at the same time, enabling the cables to be adjusted in length to achieve a personalized length. Thus, the cable connector according to some embodiments of the invention can serve as a smart two-in-one device having two functions, i.e. the cable connector prevents cable entanglement while also enabling cable length adjustment. It is an advantage with some embodiments of the invention that only one cable connector is necessary for serving two different purposes as there are less accessory items to keep track of and handle. Thus, also the total cost for buying accessory items may be reduced. Furthermore, the risk for damaging various items, such as a portable electronic device and its connections, may be limited, since cables do not get entangled and/or stuck. In some embodiments, the cable connector does not have to be a combination of a cable and a cable sleeve, i.e. in those cases the cable sleeve could be sold and used as a separate accessory item for portable electronic devices or sold as a spare part separately for enhancing the possibility for the user to buy additional cable sleeves or replace old ones that are damaged or defect.

BRIEF DESCRIPTION OF THE DRAWINGS

Further objects, features and advantages of the invention will appear from the following detailed description of embodiments of the invention, wherein embodiments of the invention will be described in more detail with reference to the accompanying drawings, in which.

DETAILED DESCRIPTION OF EMBODIMENTS

An aspect of the present invention will be described more fully hereinafter with reference to the accompanying drawings. FIGS. 1-7 show different views of the cable connector 10, 100 according to embodiments of the invention. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figures 6, 7:
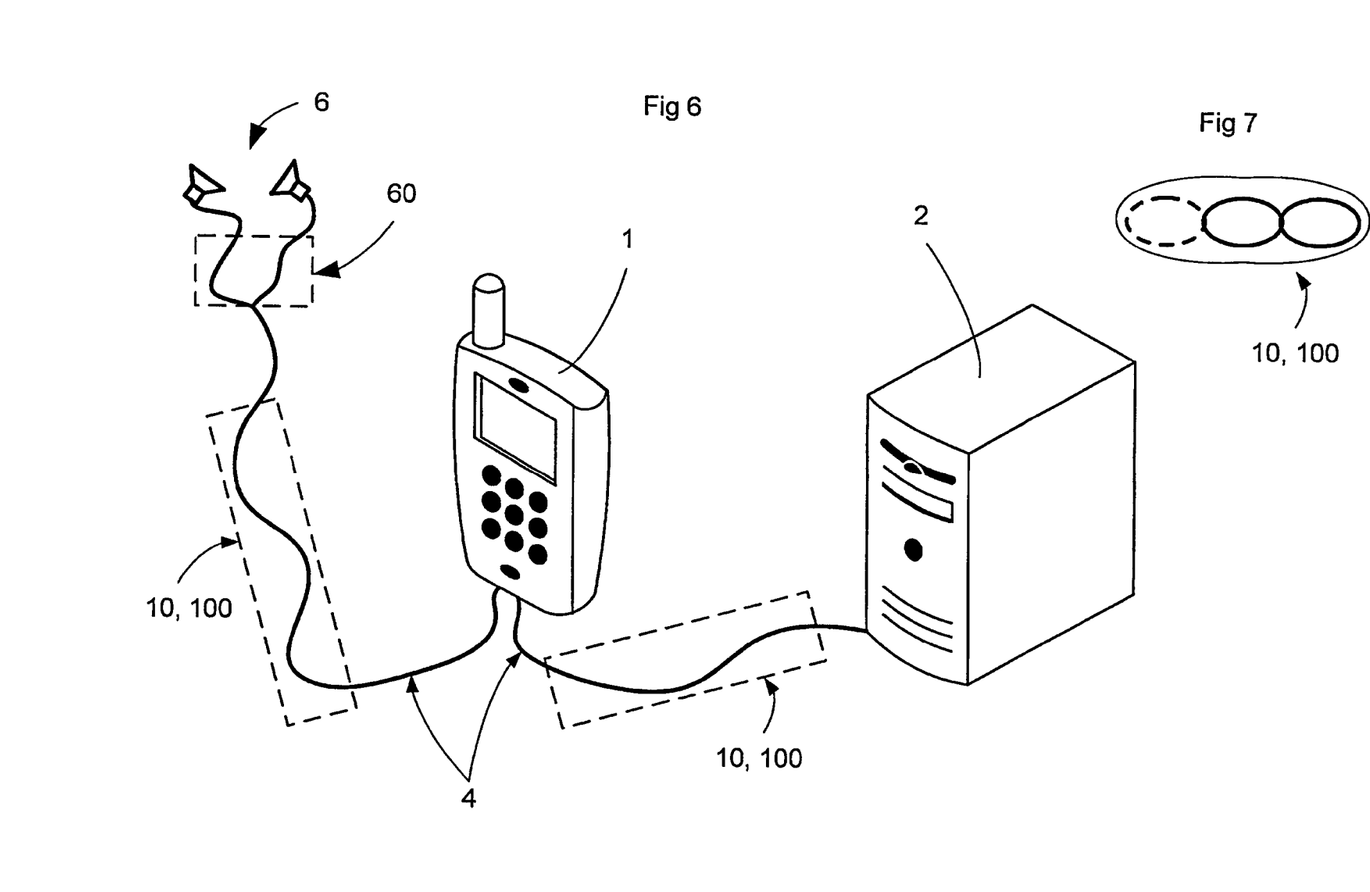
FIG. 6 shows schematically a perspective view of a portable electronic device optionally connected by cable connectors to either a portable accessory item in the form of a earphone or a stationary computer, respectively, or both the earphone and the computer, as exemplary usage of the cable connector shown in FIGS. 1 to 5.
FIG. 7 shows an alternative cross-section of another embodiment of the cable connector shown in FIGS. 1 to 6.

The cable connector 10, 100 according to the disclosed embodiments is preferably, but not necessarily, intended for the usage together with a portable electronic device 1 (see FIG. 6). The portable electronic device may be any portable electronic device such as, e.g. a mobile radio terminal, a mobile telephone, a cellular telephone, a pager, a communicator, a smart phone, a Personal Digital Assistant (PDA), an electronic organizer, a computer 2, a digital audio player such as a MP3-player or an iPod®, a digital camera, an electronic picture frame, a television receiver, a Home cinema, or any other suitable picture or movie projector.

The cable connector 10, 100 comprises a single elongated body 20, 200 in the form of a flexible tube-shaped body at least partly enclosing a cable 4. As can be seen in the figures, the single elongated hollow body 20, 200 is provided with openings at each end and at least one through hole 21, 210 at each edge of the end opening. The tube or cable sleeve 20, 200 comprises at least one sliding means 30, 300 at each end opening. In each embodiment (shown in FIGS. 1-5), each of the sliding means 30, 300 is affixed to the edge line around the end opening of the cable sleeve 20, 200 by being introduced in the associated through hole 21, 210. In one embodiment, at least one sliding means 300 is connected to the cable sleeve 200 at one cable sleeve end 200B and the other sliding means is connected to or integrated in the other cable sleeve end 200A. The sliding means 30, 300 of each embodiment are larger than the end openings of the cable sleeve 20, 200 and form grips such that the sliding means may easily be pulled away from each other. The sliding means 30 may in some embodiments be attached to the cable sleeve end opening by sewing if the cable sleeve is made of flexible fabric or be protrusions integrated at the cable sleeve end opening giving a sufficient grip area when pulled.

The cable connector 10, 100 comprises the cable 4 of optional length with connectors at each end, one connector 40 at a first end and another connector 50 at a second end 50. The cable sleeve 20, 200 may extend along the whole cable length, but, extend preferably at least along a portion of the cable length in such a way that the two connecting plugs 40 and 50 are exposed at each end of the cable sleeve. This enables each plug to be easily gripped and connected to or detached from electronic appliances. The connectors are any known type of connectors, e.g. USB.

Figure 1:
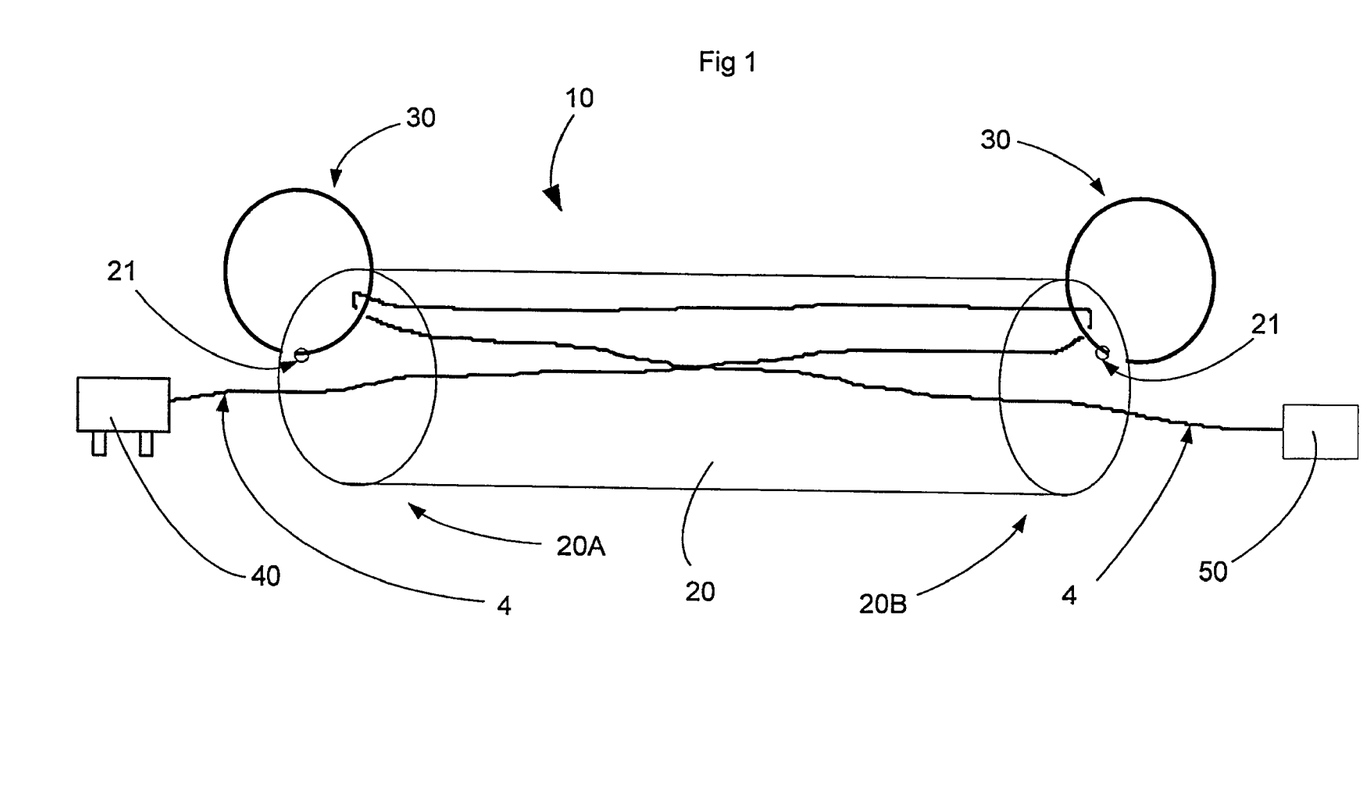
FIG. 1 shows a view of a cable connector according to an embodiment of the invention when the cable connector is in a contracted state.
Figure 2:
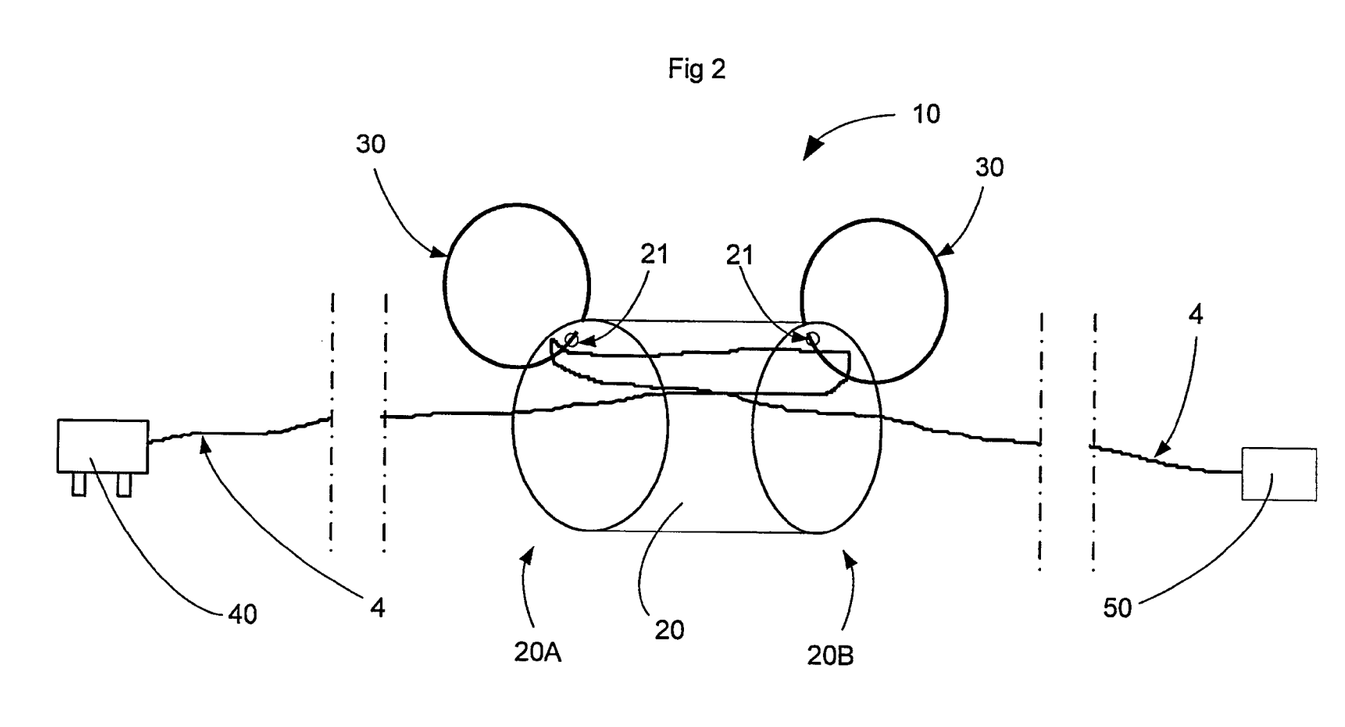
FIG. 2 shows a view of the cable connector in FIG. 1 when the cable connector is in an extended/elongated state.

The cable connector 10 and the cable 4 in a first embodiment shown in FIGS. 1 to 2 are connected by introducing the first connector 40 or the second connector 50 through a first opening at the first end 20A of the cable sleeve 20 a first time, and leading it through the whole cable sleeve length and out of the second opening at the second cable sleeve end 20B. Then, the connector 40 or 50 passed through the cable sleeve is inserted through the sliding means 30 at this second end 20B of the cable sleeve and guided back through the second opening and lead along the whole cable sleeve length a second time out of the first opening at the first cable sleeve end 20A and inserted through the second sliding means 30 at this first cable sleeve end and guided back through the first cable sleeve opening at the first cable sleeve end 20A along the whole cable sleeve length a third time and out of the second opening at the second cable sleeve end 20B once again.

Figure 3:
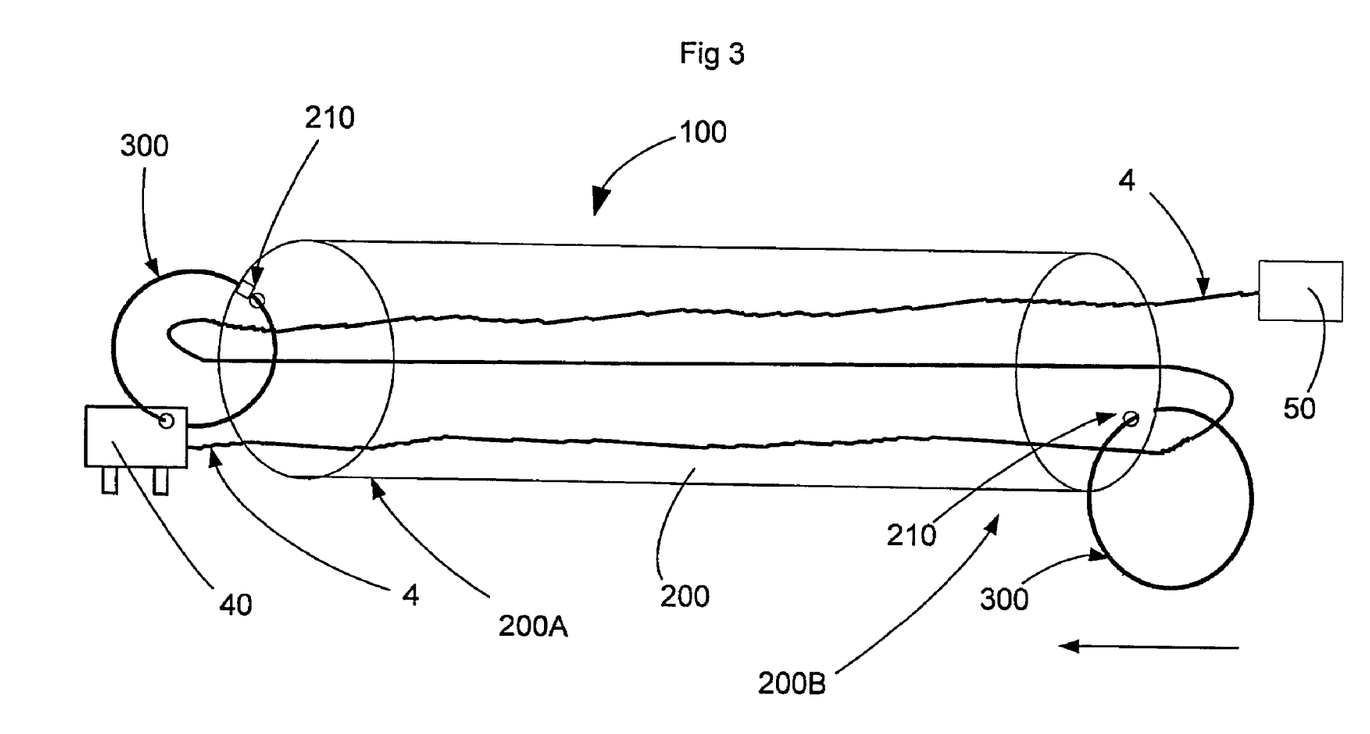
FIG. 3 shows a view of a cable connector according to another embodiment of the invention when the cable connector is in a contracted state.
Figure 4:
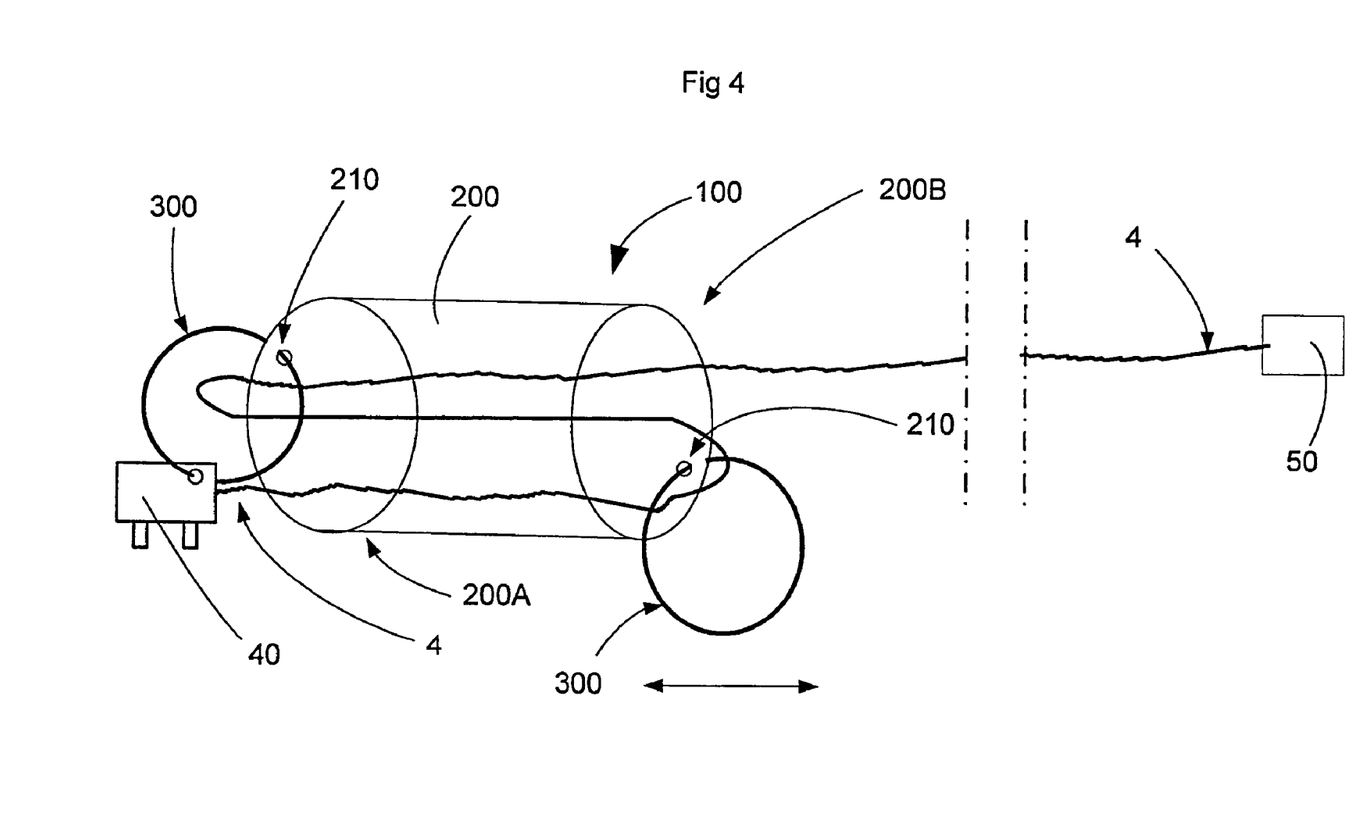
FIG. 4 shows a view of the cable connector in FIG. 3 when the cable connector is in an elongated state.
Figure 5:
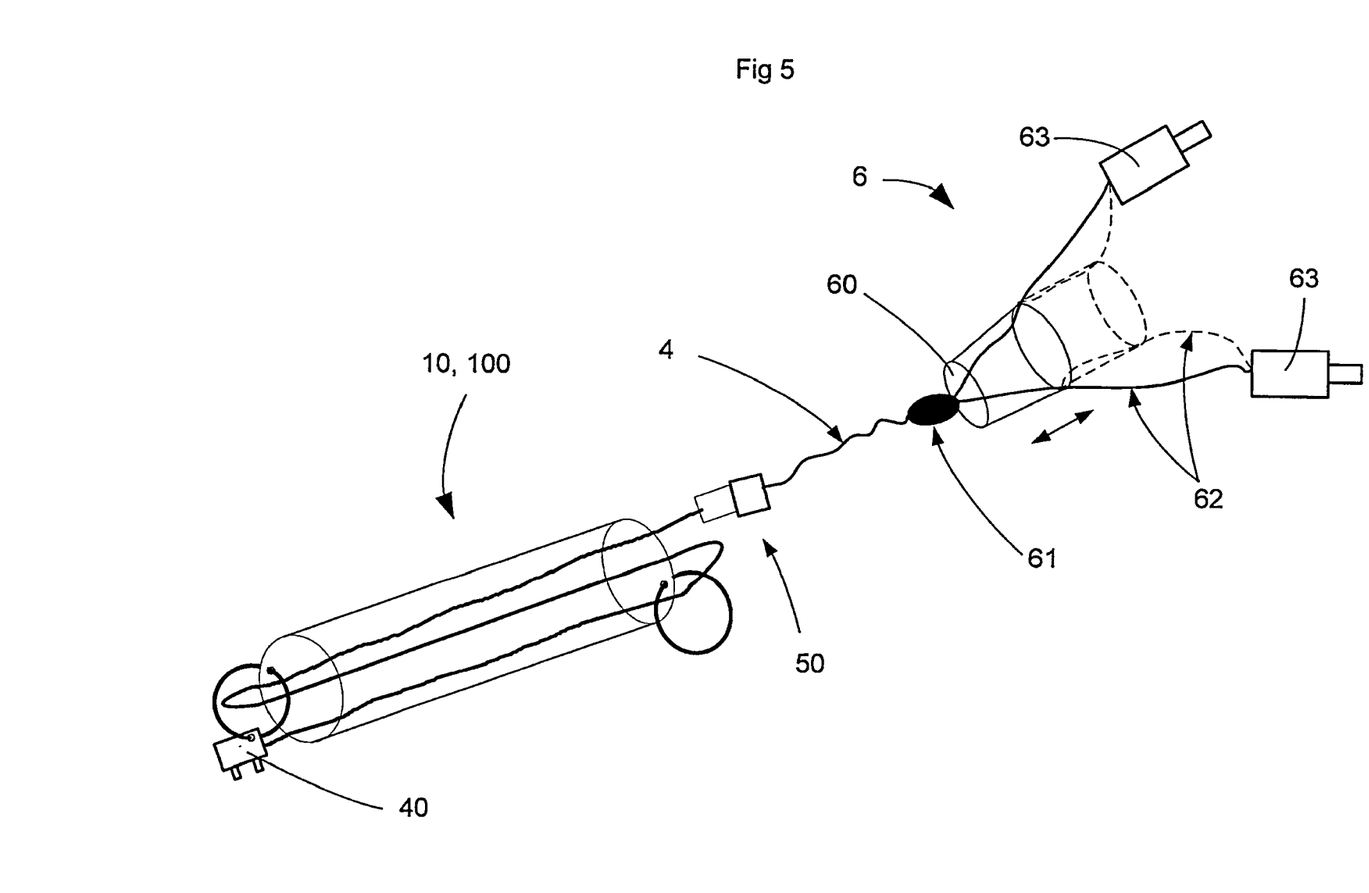
FIG. 5 shows a perspective view of yet another embodiment of the cable connector shown in FIGS. 1 to 4 as well as an accessory item that is used together with the cable connector.

In FIGS. 3 to 5, another embodiment of the cable connector 100 is shown. Here, the cable connector 100 and the cable 4 are connected together in the same way as for the earlier embodiment of the cable connector 10. The only difference between these two embodiments is that one of the sliding means 300 is connected to or integrated in one of the connectors 40 or 50, it does not matter which connector, such that this sliding means is affixed to or a part of one connector. This means that also the associated cable sleeve end 200A or 200B is indirectly affixed to one connector 40 or 50 via this sliding means. This cable connector 100 works in principle in the same way as the former cable connector 10, but, in this latter embodiment, the cable sleeve end 200A or 200B fixed to one connector 40 or 50 does not move in along the cable 4 when it is retracted and extracted in comparison to the earlier cable connector 10 where both cable sleeve ends 20A and 20B move along the cable when adapted in length.

Another embodiment of the cable connector 6 is shown in FIGS. 5 and 6. This embodiment of the cable connector is a combination of any of the cable connectors 10 or 100 and an additional cable sleeve 60 fixed at one end 61 to a headset comprising a cable 62 and earphones 63. The headset may be connected in a known way to the cable 4 of any of the other cable connectors 10 or 100 or be an integrated part of any of these cable connectors. This cable connector 6 is shown without sliding means at its free end adjacent the ear phones, but may be equipped with such grip means for enhancing the pulling of the free end of the cable sleeve 60 for enclosing the earphone cables 62. The elongated state of the cable sleeve 60 for preventing cable entanglement is shown with dashed lines and the cable exposing state is shown with solid lines.

The function of the cable connector 10, 100 will now be explained with reference to FIGS. 1 to 5. If the sliding means 30, 300 are pulled away from each other the cable sleeve 20, 200 is extended and/or stretched lengthwise (as seen in FIGS. 1 and 3), or, in yet another embodiment, if the right end of the cable sleeve 60 shown with dashed lines in the right view of FIG. 5 is pulled over cables 61, the cable sleeve 60 is extended lengthwise. If the cable ends are pulled away from each other the tube-shaped cable sleeve 20, 200, 60 is collapsed, compressed or folded, i.e. lengthwise shortened (as seen in FIGS. 2, 4, and with solid lines in the right view of FIG. 5). These embodiment designs facilitate a manual extension of the cable 4 by pulling the cable ends, in this case the connectors 40, 50 away from each other, whereby the portions of the cable length overlapping each other inside the tube, i.e. the cable sleeve 20, 200, are decreased in length, whereby the decreasing length of these cable portions inside the cable sleeve adds in length to the cable portions outside the cable sleeve, which extends or prolongs the total length of the cable 4. These embodiment designs also facilitate, at the same time, the manual shortening of the cable, i.e. the reverse effect by increasing the overlapping length inside the elongating cable sleeve such that the total length of the cable 4 is decreased, by pulling the sliding means 30, 300 away from each other as explained above for the function of the cable sleeve 20, 200. This enables the user to adapt the length of the cable to its desired usage, while preventing the cable to get entangled, whereby the cable is easily personalized in length and may be put in and taken out of a pocket, handbag or similar storage smoothly and easily. In FIGS. 3, 4, and 5, the separate arrows show possible directions of movement for the sleeve 20, 200, 60.

In some embodiments of the cable connector 10, 100 the cable sleeve 20, 200 may be separated lengthwise, i.e. the sleeve may comprise more than one through hole. The sleeve may comprise at least two separate channels or lead-throughs from one end 20A, 200A to the other end 20B, 200B, whereby each channel forms one cable run for the cable 4. This means that no more than one cable length runs through each channel forming a single-circuit line and that the cross-section of the sleeve 20, 200 may be double-barrelled (not shown) or triple-barrelled as shown in FIG. 7. The lengthwise separation of the cable length channels may be performed by sewing or adhesion, e.g. gluing, if the sleeve is made of fabric, plastic or rubber, or by equipping one larger sleeve or tube with two or more smaller sleeves or tubes passing through the larger sleeve.

In each embodiment of the cable connector 10, 100, 6 according to the invention, the cable sleeve 20, 200, 60 has an inherent or integrated elasticity or resilience. This elasticity may be achieved by equipping the sleeve with elastic members or flexible material, e.g. springs in the form of rings or other structures or by combining different layers of material or materials with different features, such as fabric made of cotton and Elastan, i.e. Spandex or Lycra. In other embodiments, the cable sleeve may be made of leather or a polymer material, such as synthetic rubber or a fabric, e.g. synthetic and/or textile. An example of a suitable synthetic rubber is Neoprene®, which is the trade name of a synthetic rubber from DuPont Performance Elastomers.

The cable sleeve 20, 200 may also be a cloth-like piece of fabric (not shown) with fastening means along two opposing edge lines for detachably connecting the two edge lines to each other forming a closed tube or sleeve to be wrapped around the cable 4. In some embodiments, the fastening means comprises at least one press stud, or could, in another embodiment, e.g., comprise a Velcro® fastening means.

In the disclosed embodiments, the elongated sleeve 20, 200 is in the form of a closed tube.

The present invention has been described above with reference to a specific embodiment. Many modifications can be made by a person skilled in the art. The embodiment described above is merely an illustrative example and the invention can be modified and used together with many different products, not only portable electronic devices as indicated in the detailed description. The different features of the invention can be combined in other combinations than those described. The invention is only limited by the appended claims.

What is claimed is:

1. A cable connector for connection to at least one electronic device, comprising at least one cable, at least one cable sleeve adapted to be adjustable in length for enabling cable length adjustability when retracting and extracting the cable, and at least two sliding means, each sliding means being affixed to a respective end opening of the cable sleeve, the cable being arranged to run backwards and forwards through the sleeve and the sliding means in a meandering way in both the retracted and the extracted state of the cable, and the sleeve being adapted to restrict the movement of the cable in at least one direction.

2. The cable connector as recited in claim 1, wherein each sliding means has the function of a tackle.

3. The cable connector as recited in claim 1, wherein each sliding means is a ring.

4. The cable connector as recited in claim 1, wherein the cable has two connectors, one connector at each end, and at least one connector comprises at least one sliding means.

5. The cable connector as recited in claim 1, wherein each sliding means is larger than the cable sleeve openings.

6. The cable connector as recited in claim 1, wherein the cable connector is intended for the usage together with a portable electronic device.

7. The cable connector as recited in claim 6, wherein the cable connector is adapted for connecting a headset to the portable electronic device.

8. The cable connector as recited in claim 6, wherein the cable connector is intended for the usage together with the portable electronic device, wherein the portable electronic device is a device from a group comprising: a mobile radio terminal, a mobile telephone, a cellular telephone, a pager, a communicator, a smart phone, a Personal Digital Assistant (PDA), an electronic organizer, a computer, an audio player or a digital camera.

9. The cable connector as recited in claim 1, wherein the cable sleeve has an inherent/integrated elasticity/resilience.

10. The cable connector as recited in claim 9, wherein the cable sleeve is made of a flexible material.

11. The cable connector as recited in claim 10, wherein the cable sleeve is made of leather, fabric or a synthetic rubber material.

12. The cable connector as recited in claim 1, wherein the cable sleeve comprises at least two separate channels, lead-throughs or, through-connections, whereby each channel forms one cable run for the cable such that no more than one cable runs through each channel or single-circuit line.

13. The cable connector as recited in claim 4, wherein at least one connector has at least one integrated sliding means.

14. The cable connector as recited in claim 4, wherein at least one connector has an integrated attachment for at least one sliding means.

15. A cable sleeve adapted to be connected to at least one cable, wherein the cable sleeve and the cable after connection form a cable connector according to claim 1.

16. A cable connector for connection to at least one electronic device, comprising at least one cable, at least one cable sleeve, and at least two sliding means, each sliding means being affixed to a respective end opening of the cable sleeve, the cable being arranged to run through the sleeve and the sliding means and the sleeve being adapted to restrict the movement of the cable in at least one direction wherein:
 the cable connector is intended for the usage together with a portable electronic device;
 the headset comprises an additional cable sleeve for restricting the movement of at least one cable of the headset in at least one direction.

17. The cable connector as recited in claim 16, wherein the headset cable sleeve is adapted to be fixedly attached with one end at a connector end of the headset and to extend with the other sleeve end towards the earphones of the headset.

\* \* \* \* \*